Figure 4:
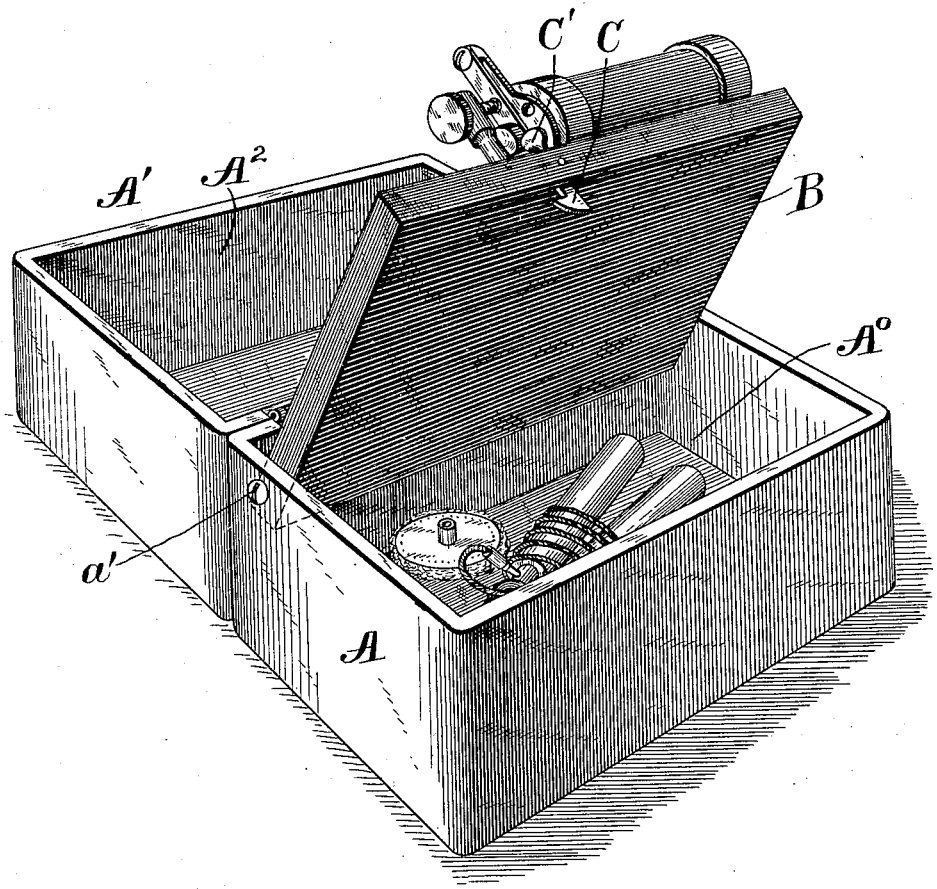

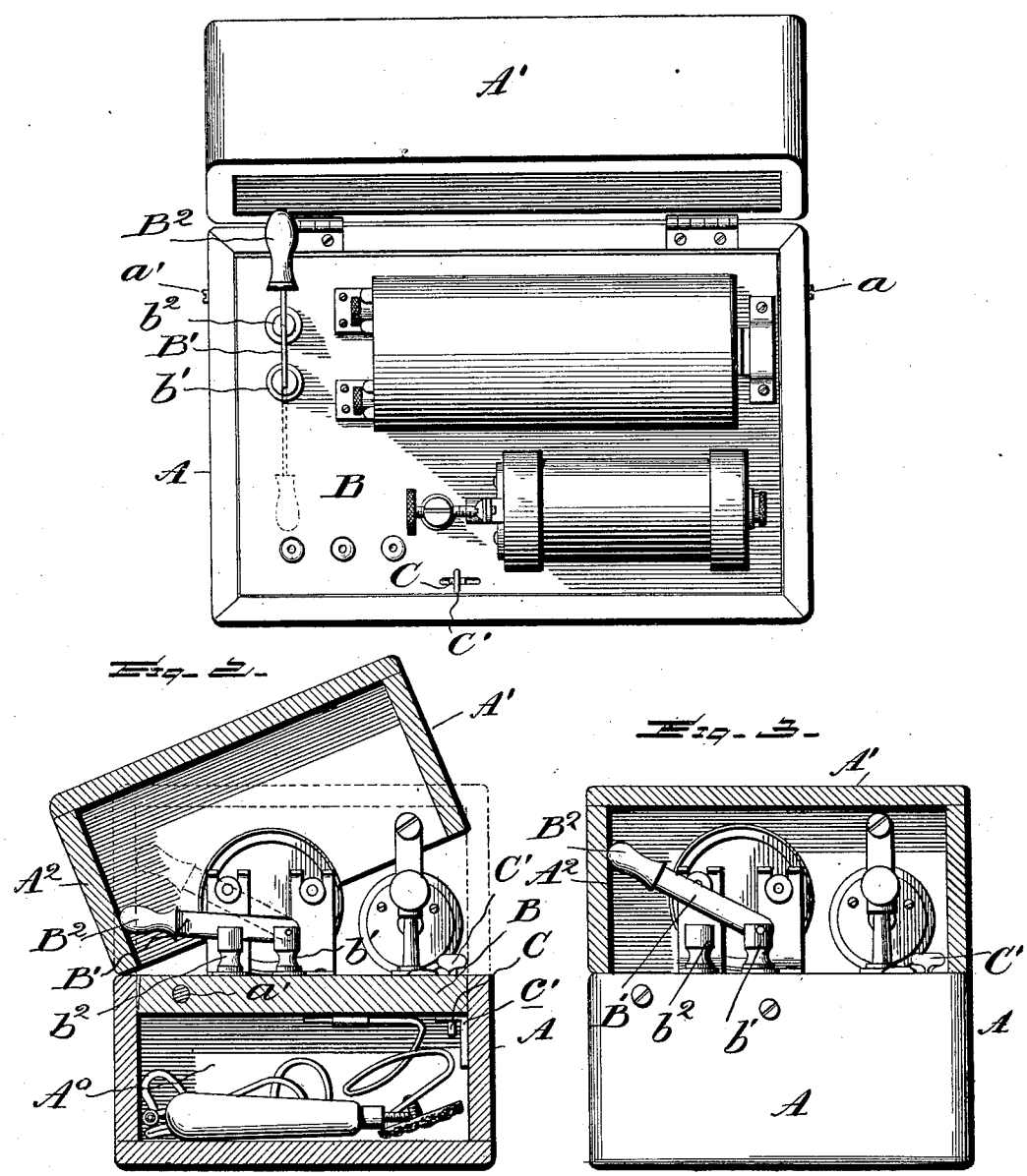

No. 677,652. Patented July 2, 1901.
M. E. FULD.
PORTABLE ELECTRIC BATTERY.
(Application filed May 17, 1900. Renewed May 21, 1901.)
(No Model.) 2 Sheets—Sheet 2.

UNITED STATES PATENT OFFICE.

MANES E. FULD, OF BALTIMORE, MARYLAND.

PORTABLE ELECTRIC BATTERY.

SPECIFICATION forming part of Letters Patent No. 677,652, dated July 2, 1901.

Application filed May 17, 1900. Renewed May 21, 1901. Serial No. 61,318. (No model.)

*To all whom it may concern:*

Be it known that I, MANES E. FULD, a citizen of the United States, residing at Baltimore city, in the State of Maryland, have invented certain new and useful Improvements in Portable Electric Batteries; and I do hereby declare the following to be a full, clear, and exact description of the invention, such as will enable others skilled in the art to which it appertains to make and use the same.

My invention relates to improvements in portable electric batteries, and has for its object to provide certain improvements adding to the efficiency and convenience in use of the battery, as well as certain features which tend to prevent waste of the battery, all as hereinafter described and claimed.

My invention consists in a peculiar manner of mounting the battery-cell, induction-coil, and controlling-switch upon a false top pivoted in the upper part of the box or case and arranged to cover the receptacle in which are kept the electrodes and other accessories and also in a peculiar manner of mounting the switch, so that the closing of the lid of the box will cause the breaking of the circuit, rendering the battery inoperative, and thus preventing waste.

My invention will be understood by reference to the accompanying drawings, wherein the same parts are indicated by the same letters of reference throughout the several views.

Figure 1 represents a top plan view of the battery-case, showing the lid in the open position. Fig. 2 is a cross-sectional view showing the lid in full lines as partially open and in dotted lines as fully closed. Fig. 3 is a view, partly in section, transversely through the upper portion of the box, showing the position of the switch when the lid of the box is closed. Fig. 4 is a perspective view of the battery fully open with the false top raised, showing the receptacle for electrodes and other accessories.

The box or case A is of any appropriate size or shape, preferably rectangular, to receive conveniently the false top B, to which are fixed the cell, induction-coil, switch, and connections of the battery. The false top B is mounted in the upper portion of the box A, and the lid or cover A' of the box or case is sufficiently deep to allow it to close fully over the devices located above the surfaces of the false top B.

b' represents one of the contact-pieces to which the switch B' is pivoted, and b² represents the other contact-piece with which the switch B' is adapted to engage, and thus complete the circuit.

The switch B' is provided with a handle B², having a preferably rounded end, as shown, and this handle when the switch is closed extends beyond the plane of the inner wall A² of the cover of the box, thus rendering it possible to throw the switch B' over fully into the socket in the contact-piece b² only when the lid or cover of the box is turned back into the open position. The cover A' is hinged along the rear side of the box, so that its rear wall A² will lie in the same vertical plane with the rear wall of the box A when said cover is closed. When the cover A' is thrown back to the open position, the switch B' may be opened or closed at will; but upon moving the cover over to its closed position when the switch B' is closed the rear wall A² of the cover engages beneath the end of the handle B² of the switch B' and exerts upon the switch B' an upward wedging effect, which causes the complete disengagement of the switch B' from the contact-piece b² just before the box-cover is entirely closed. In this way it is impossible to close the cover of the box without breaking the current, and this is of considerable advantage in that it prevents injury to the battery through a failure to shift the switch, from carelessness, or for any other reason.

The false top B of the battery is pivoted within the upper portion of the box A by means of a pair of pins or screws a' a' or an equivalent arrangement, which pass through the ends of the box, engaging the end edges of the false top B at or near its rear edge, as seen most clearly in Figs. 1, 2, and 4. By this arrangement a receptacle A⁰ is provided in the bottom of the box A for receiving the electrodes and their connections and other accessories which ordinarily belong with the battery. A spring-catch C is preferably provided at the front edge of the false top B, and said catch has a beveled point adapted to engage a stop c', fixed to the inner side of the front wall of the box. The catch is provided with a lug C' upon its upper end projecting above the surface of the false top B for the manipulation thereof.

By fitting the box A with the false top B, pivoted as shown, a very convenient receptacle for the accessories is provided, and when the said false top is closed these parts are all hidden from view and the battery has a neat compact appearance, which is very desirable in apparatus of this class.

Having thus described my invention, what I claim, and desire to secure by Letters Patent of the United States, is—

1. In a portable electric battery the combination with a box having a hinged cover, of a false top pivoted in the said box, a battery-cell, induction-coil and connections mounted on the said false top, and a receptacle below the false top, substantially as described.

2. In a portable electric battery the combination with a box having a hinged cover, of a false top pivoted in the said box and having the battery-cell, induction-coil and connections mounted thereon, a pivoted switch mounted upon said false top and having a lever extending through the plane of the hinged cover when the switch is closed, and a receptacle below said false top, substantially as described.

3. In a portable electric battery, the combination with a box having a hinged cover, of a false top pivoted in the said box and having the battery-cell, induction-coil and connections mounted thereon, a pivoted switch mounted upon said false top and arranged to be opened by the closing of the cover, and a receptacle below the said false top, substantially as described.

In testimony whereof I affix my signature in presence of two witnesses.

MANES E. FULD.

Witnesses:
G. HOWARD DUVALL,
THOS. J. BOHANNAN.